United States Patent Office 3,211,654
Patented Oct. 12, 1965

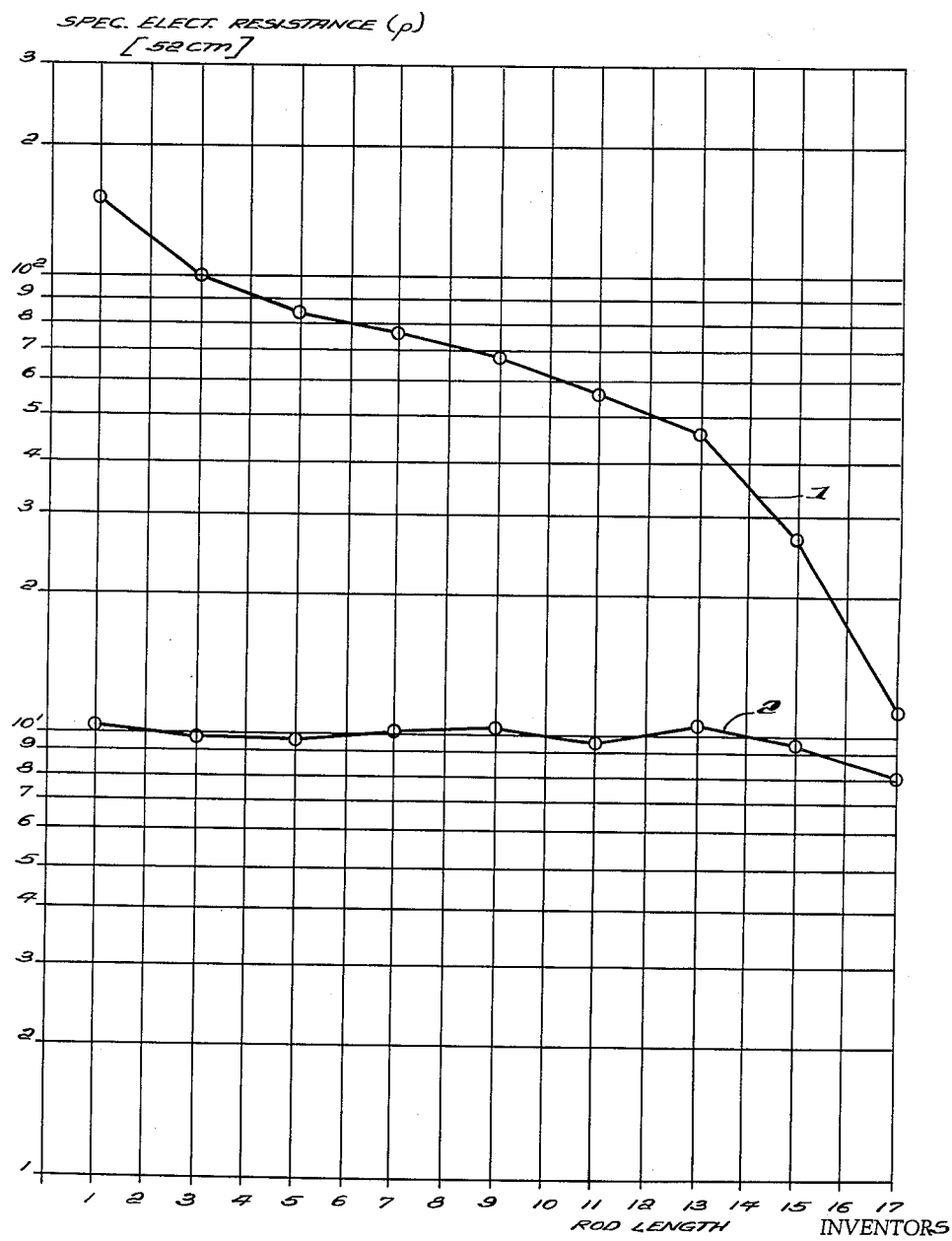

3,211,654
PROCESS FOR PREDETERMINED DOPING OF HIGHLY PURE SUBSTANCES
Herbert Jacob, Burghausen, Upper Bavaria, and Julius Nickl, Munich, Germany, assignors to Wacker-Chemie G.m.b.H., Munich, Germany
Filed Dec. 21, 1961, Ser. No. 161,126
Claims priority, application Germany, Dec. 23, 1960, W 29,154; Dec. 30, 1960, W 29,190
9 Claims. (Cl. 252—62.3)

The present invention relates to an improved process for doping substances to alter their properties in a desired direction by the introduction of foreign substances.

A procedure for doping silicon rods has already been developed wherein boron containing glass filaments are sintered on such rods and the rods then subjected to a zone melting process. This process has the disadvantage that the boron containing glass also contains other materials which disturb the actual doping and also render it difficult to produce monocrystalline rods. Furthermore, lumpy structures are formed on the fused zone which can only be eliminated by repeated zone melting.

In another process pills containing doping substances are placed in depressions in the solid silicon rod and the rod is then subjected to zone melting. The difficulty in this process is that the rods must be processed mechanically before being subjected to the zone melting procedure whereby contamination of the rods is not out of the question.

In a further process for doping silicon with boron the boron is electrolytically deposited on the silicon rod before the latter is subjected to zone melting. This process, however, is not satisfactory for doping with phosphorus. A further and substantially greater disadvantage is the non-uniform deposit of the boron along the length of the silicon rod and it is therefore not possible to achieve predetermined doping within an exactitude of a few percent.

In the process according to the invention predetermined doping of highly pure substances is effected by applying the doping substances to the body to be doped in the form of a solution or dispersion in a volatile liquid prior to zone melting, evaporating off the liquid employed for such solution or dispersion and subjecting the thus treated body to zone melting.

The term "predetermined doping" is employed herein to signify the alteration of given electrical, optical, magnetic and/or mechanical properties of a body in a certain way by the incorporation of doping substances (foreign substances), the alteration in such properties achieved being determined by the type and quantity of the doping substances incorporated. Furthermore, it is also to be understood that predetermined doping includes provision of a predetermined distribution of the doping substance along a geometrical dimension, such as, the longitudinal axis, of the doped body.

The doping agents are employed according to the process of the invention in the form of true solutions, and/or colloidal solutions or suspensions or emulsions. Inorganic or organic liquids, such as, water, alcohols, oils, benzene and the like, are adopted as the solvents or dispersing agents for the doping agents. However, solutions of acids or alkalies can also be used.

Acids, alkalies, salts, elements, liquids and/or solid solutions in finely divided state are suited as the actual doping substances.

The following procedure has, for example, been found suited for the doping of semi conductors with solid solutions of elements:

Several grams of silicon, for instance, are heavily doped with phosphorus, antimony, boron or aluminum without taking any extreme care as to the exactness of the doping degree achieved. The doping degree is only ascertained after the doping. The doped silicon is then finely distributed in water so that practically a colloidal solution or dispersion results. The resulting disperse system is then applied to silicon rods in the form of drops and/or films and the water evaporated and the thus treated rods subjected to zone melting.

Accordingly boron rods can be doped with silicon by first preparing boron heavily doped with silicon, dispersing such heavily doped boron in water or methanol and applying drops of such dispersion on the boron rods and after evaporation of the dispersing liquid subjecting the rods to zone melting. The boron rods obtained are doped in a predetermined manner and have the silicon homogeneously distributed therein. It is also possible to apply dispersed silicon by itself to the boron rods with subsequent zone melting.

In doping gallium arsenide, a gallium arsenide heavily doped with zinc is first prepared which, as in the case of silicon, is dispersed in water or another liquid for application to the gallium arsenide body to be doped. An analogous procedure is employed in doping other III/V group compounds or germanium. It also is possible to produce a dispersion of boron in a known manner and to apply it as a colloidal solution.

The application of the liquid, disperse, doping substance system to the body which is to be doped can be effected in numerous ways, for example, as discrete quantities in the form of drops and/or homogeneously as a film. The application of cohesive strip shaped liquid films is facilitated if the surface of the body to be doped is first roughened, for example, by etching or by the addition of viscosity increasing agents, such as glycerine, gelatine or oils to the doping liquid.

According to a further modification of the process according to the invention the doping substance is applied as a film to the surface of the bodies to be doped in the form of a viscous solution in which the viscosity of such solution is provided by the doping substance itself. This modification avoids the necessity of including foreign viscosity increasing substances which may under some circumstances introduce deleterious impurities.

The viscous solution, for example, may be applied to the body to be doped with the aid of rubber rollers or stamps in the form of a film of definite thickness and width.

Homogeneous or inhomogeneous doping can be attained by proper selection of the geometric disposition of the film of doping substance. Similarly it is possible to compensate for previously existing inhomogeneous doping. This fundamentally can be achieved by varying the thickness and/or width of the film applied in the axial direction or by application of a film of uniform thickness and width spirally along the length of the body to be doped with uniformly or non-uniformly spaced windings.

The process according to the invention can be employed in conjunction with crucibleless zone melting or zone melting in vessels under vacuum or a protective atmosphere. It is also suited for the production of doped single crystals according to the Czochralski process (crucible pulling process). In connection with the crucible pulling process, the process according to the invention provides the advantage that a uniform distribution of the doping substance can already be achieved on the starting bodies before the melting procedure. Elements and compounds can be doped by such procedure.

One of the substantial advantages of the process according to the invention is that it is especially adapted for large scale technical production of doped bodies. A further advantage is that only known metering apparatus is required for the application of the liquid doping agent and the action of such doping agent can be adjusted by simple dilution. For example, the liquid doping agent can be applied to rods or tubes of silicon or germanium with a microburette provided with an advancing mechanism. In such case the starting rod or tube is placed below the outlet end of the burette and the first drop applied 3 mm. from its end. The advancing mechanism is so arranged that the rod or tube is advanced about 0.5 cm. each time the burette is turned off so that further drops can be applied at 0.5 cm. intervals. The thus prepared rod or tube is then passed under a strong infra red irradiator to dry on the individual drops. It is of advantage when silicon or boron bodies are to be doped if the doping liquid is slightly alkaline as this causes better adhesion of the doping substances. The quantity of liquid to be applied in each instance and the required length of the advance are calculated in advance from the original doping substance content of the starting rod or tube, for example, by determining the specific electric resistance along the length of the rod or tube.

In comparison with the previously known processes the process according to the present invention has the substantial advantage that substances can be doped with greater exactitude. Variations lie between about 0.1% to a maximum of 5%, an exactitude previously not attained.

In the semi conductor art the process according to the invention, for example, offers the advantage that a rod having fluctuating properties can be doped in such a way that a certain property is given a certain value in all portions of the rod.

The accompanying drawing shows a graph illustrating the specific electric resistance of an $18 \pm 0.2$ mm. thick p-conductive silicon rod before and after doping according to the invention. In such drawing, curve 1 shows the specific resistance of the rod before doping and curve 2 after doping. The practically straight lined course of the resistance in the doped rod was achieved in that corresponding to the course of the resistance from left to right in the rod originally correspondly less doping substance was applied. This, for example, can be achieved by changing the spacing between the drops of doping liquid applied or by changing the size of the drops applied. Analogously when the doping liquid is applied as a film variations in the quantity of doping substance supplied can be achieved by varying the film thickness and/or width.

Of course, the process according to the invention can also be employed to achieve the opposite effect so as to produce bodies with inhomogeneous properties. For example, if droplets of uniform size are applied along the axis of a germanium rod with continuously increasing spacing between the droplets, the resistance curve of the doped rod can be caused to follow a predetermined course.

The following examples will serve to illustrate several embodiments of the process according to the invention.

*Example 1*

A polycrystalline silicon rod having a specific electrical resistance of 100–200 ohm cm. along its axis and n-conductivity was employed as the starting rod which was to be doped. An aqueous NaOH solution of about 0.1% concentration containing 0.1 gamma of boron/cm.$^3$ ($1 \times 10^{-7}$ gram of boron/cm.$^3$) as borate was applied thereto in drops spaced 1 cm. apart and such drops dried thereon at 150° C. Subsequently such pretreated rod was subjected to zone melting in argon with the molten zone moving at a velocity of about 5 mm., per minute. The molten zone was such that it did not encompass the entire cross-section of the rod but included the surface area covered by the dried on drops of doping liquid. The rapid fusion achieved thereby caused the boron to be taken up rapidly and uniformly by the molten silicon. In repeating the zone melting process in such a way that the entire rod cross-section was fused a monocrystalline silicon rod was obtained in which specific electrical resistances up to $1 \times 10^{-4}$ ohm cm. were obtained. The specific electric resistance along the axis of the resulting doped rod can be adjusted by varying the number and distribution of the droplets of the doping solution applied. Unexpectedly it was found that relatively volatile doping substances can be incorporated in the bodies to be doped with this doping process. For example, phosphorus can be applied in the form of phosphate solutions.

*Example 2*

Potassium polyphosphate was prepared according to R. Pfanstiel and R. K. Iler, J. Am. Chem. Soc. 74, 6059, 1952, and 1 g. thereof was dissolved in 100 cc. of water. The resulting solution had a viscosity comparable to that of glycerine. A strip 2 mm. wide and $10\mu$ thick of such solution was applied along the length of a silicon rod. The volume of such applied liquid per cm. length of strip was 0.2 mm.$^3$. As each mm.$^3$ of the polyphosphate solution contained 2.6 micrograms of phosphorus, 0.5 microgram of phosphorus were applied to the silicon rod per cm. of the applied strip. The strip was dried and the thus treated silicon rod subjected to zone melting to distribute the phosphorus homogeneously therein. Large quantities of polyphosphate solution can be applied to the rod by applying a plurality of strips thereof along the length of the rod or by applying such strip spirally around the rod. In the spiral application of the solution local concentration variations may be achieved along the length of the rod by varying the spacing between the spirals.

Analogously a viscous aqueous zinc chloride solution can be employed in the doping of gallium arsenide.

Zone melting takes place in this example as well as in Example 1 by means of electrical high frequency.

We claim:
1. In a process for the predetermined doping of a fusible high purity substance by incorporation of a doping substance therein in a desired predetermined distribution, the steps of applying a predetermined quantity of a volatile liquid containing a relatively small predetermined quantity of the doping substance uniformly distributed therein to the surface of the body to be doped in a predetermined distribution over such surface area, evaporating the liquid after such application to leave the doping substance upon the surface of such body and then zone melting the thus treated body to incorporate the doping substance left on the surface thereof therein.

2. The process of claim 1 in which the doping substance is applied to the surface of the body to be doped in the form of a viscous solution in the volatile liquid, the viscosity of which is provided by the doping substance itself.

3. The process of claim 1 in which the doping substance is applied to the body to be doped in the form of a colloidal solution in the volatile liquid.

4. The process of claim 1 in which the doping substance is applied to the body to be doped in the form of an emulsion in the volatile liquid.

5. The process of claim 1 in which the liquid containing the doping substance is applied to the body to be doped in the form of a film.

6. The process of claim 1 in which the liquid containing the doping substance is applied to the body to be doped in the form of drops.

7. The process of claim 1 in which the body to be doped is an elongated body and the liquid containing the doping substance is applied thereto in the form of a continuous strip in the direction of the longitudinal axis of the body to be doped.

8. The process of claim 1 in which the body to be doped is in the form of a rod and the liquid containing the doping substance is applied thereto in the form of a strip spirally around such rod with uniformly spaced windings.

9. The process of claim 1 in which the body to be doped is in the form of a rod and the liquid containing the doping substance is applied thereto in the form of a strip spirally around such rod with non-uniformly spaced windings.

References Cited by the Examiner
UNITED STATES PATENTS

| | | | |
|---|---|---|---|
| 2,739,088 | 3/56 | Pfann | 252—62.3 |
| 2,794,846 | 6/57 | Fuller | 252—62.3 |
| 2,810,052 | 10/57 | Bube et al. | 252—62.3 |
| 2,916,678 | 12/59 | Bube et al. | 252—501 |
| 2,970,111 | 1/61 | Hoffmann et al. | 252—62.3 |
| 3,125,532 | 3/64 | Keller et al. | 252—62.3 |

OTHER REFERENCES

Hannay: Semiconductors, Reinhold Publ. Corp., 1959, pp. 135 and 431.

MAURICE A. BRINDISI, *Primary Examiner.*

JOSEPH R. LIBERMAN, *Examiner.*